United States Patent [19]
Gusenoff et al.

[11] Patent Number: 5,165,544
[45] Date of Patent: Nov. 24, 1992

[54] COMPUTER DISC STORAGE AND TRAVEL CASE

[75] Inventors: Steven I. Gusenoff; Ellen A. Slawsby; Ernest Silver, all of Newton, Mass.

[73] Assignee: Doublecheck, Inc., Newton, Mass.

[21] Appl. No.: 742,854

[22] Filed: Aug. 8, 1991

[51] Int. Cl.⁵ .......................................... B65D 85/57
[52] U.S. Cl. .................................. 206/444; 206/313; 383/40; 383/111
[58] Field of Search .................. 206/307-313, 206/444, 328, 524.2, 524.6; 383/38-40, 109-111

[56] References Cited

U.S. PATENT DOCUMENTS

| | | | |
|---|---|---|---|
| 4,643,308 | 2/1987 | Michel | 206/444 |
| 4,651,872 | 3/1987 | Joyce | 206/444 |
| 4,905,831 | 3/1990 | Bagdis et al. | 206/313 |
| 5,062,530 | 11/1991 | Mitsuyama | 383/39 |

Primary Examiner—Jimmy G. Foster
Attorney, Agent, or Firm—Choate, Hall & Stewart

[57] ABSTRACT

A computer disc storage and travel case including a removable protective lining, such as a lead lining, a back flap attached to a front flap to form a protective lining pocket, a lift-up flap for securing the protective lining within the lining pocket, and at least on disc pocket.

16 Claims, 3 Drawing Sheets

COMPUTER DISC STORAGE AND TRAVEL CASE

BACKGROUND OF THE INVENTION

Computer discs and the information contained thereon can be damaged when exposed to X-ray or magnetic radiation. For example, when computer discs are scanned by airport X-ray machines, valuable computer programs and data may be subject to erasure. Existing storage and travel cases for computer discs generally do not include protection against such damage. Those few storage and travel cases that do attempt to provide protection against such damage include a protective layer permanently disposed within the case. When airport security personnel become suspicious of the contents of such a case, personnel often tear open the case to inspect the contents and the protective lining. This procedure often destroys the case, and, it is therefore desirable to provide a disc storage and travel case with a removable protective lining.

SUMMARY OF THE INVENTION

The computer disc storage and travel case of the invention includes a removable protective lining, such a lead lining, a back flap attached to a front flap to form a protective lining pocket, and at least one disc pocket formed by a disc flap attached to the front flap. The protective lining limits X-ray and magnetic radiation from damaging the disc or information stored thereon, and the protective lining may be removed from the case for inspection by airport security personnel or other investigators without destroying the case.

The storage and travel case can be folded in any of various configurations to provide additional protection to the enclosed computer discs. For example, the case may be folded in thirds so that a portion of the front flap covers a portion of the back flap. An apparatus for securing the case in its folded configuration, such as for example a hook-and-wool fastener, may also be included.

BRIEF DESCRIPTION OF THE DRAWINGS

FIG. 4 is a sectional view of the storage and travel case; and

DESCRIPTION OF THE PREFERRED EMBODIMENT

Figure 1:
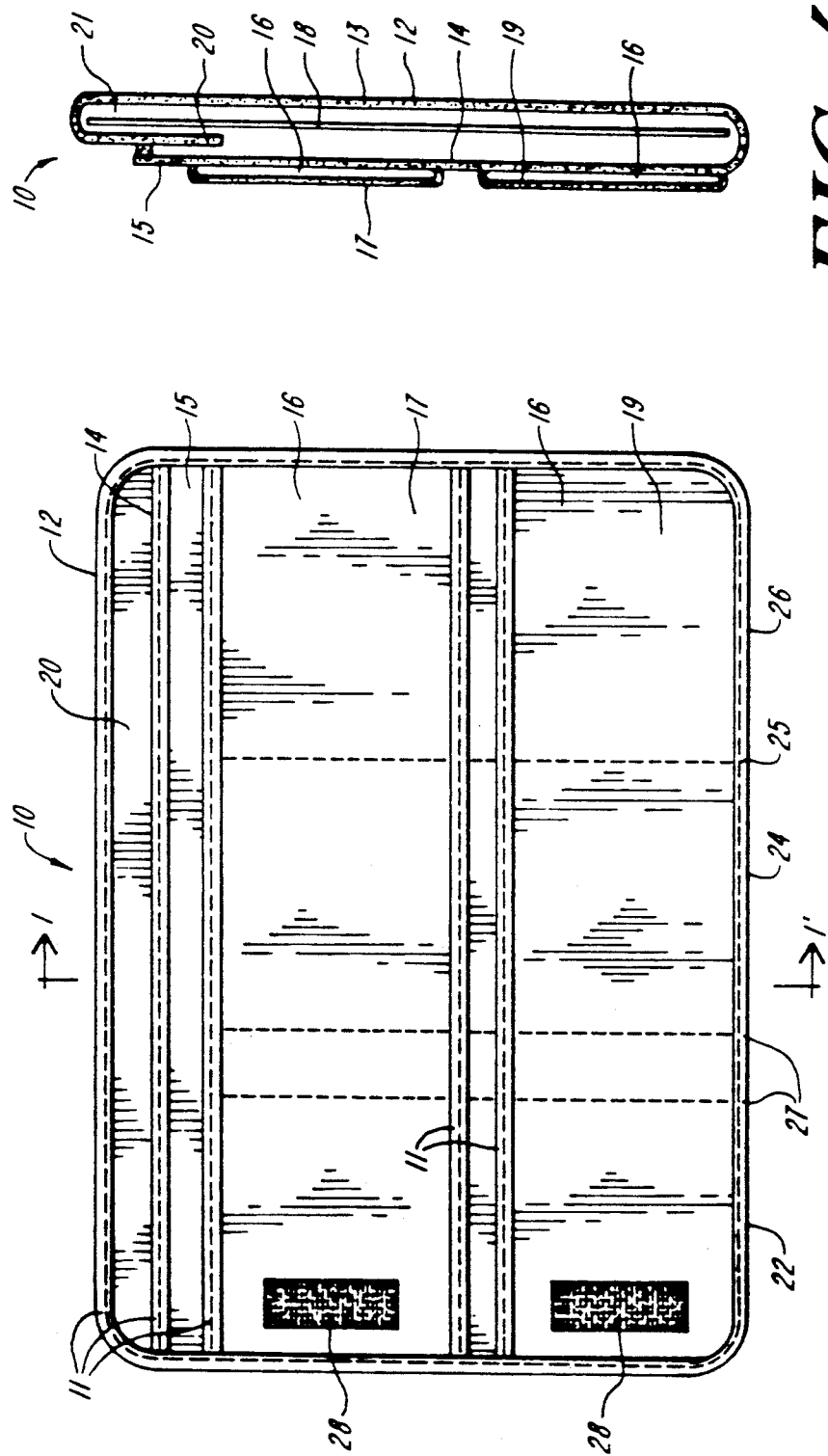
FIG. 1 is a front elevational view of the computer disc storage and travel case of the invention.
Figure 2:
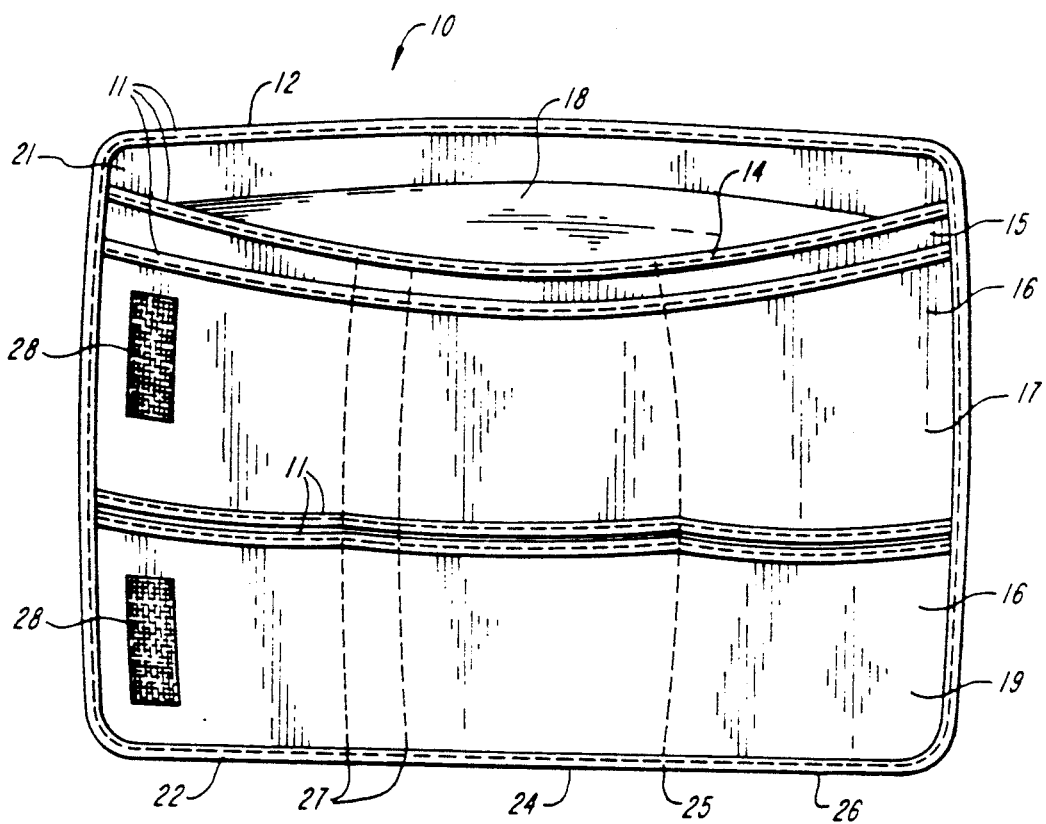
FIG. 2 is a front view of the storage and travel case showing as in FIG. 1, the front flap drawn open to reveal the protective lining.

As shown in FIGS. 1 and 2, the computer disc storage and travel case 10 of the invention includes a back flap 12 having a outside surface 13, a front flap 14 having an outside surface 15, and at least one disc pocket 16 formed by a disc flap, such as upper flap 17 or lower flap 19, attached to the outer surface 15 of the front flap 14. It is noted that one or more disc pockets can be included in the case 10 and such pockets may be sized to hold either 5¼ inch or 3½ inch computer discs.

Figure 3:
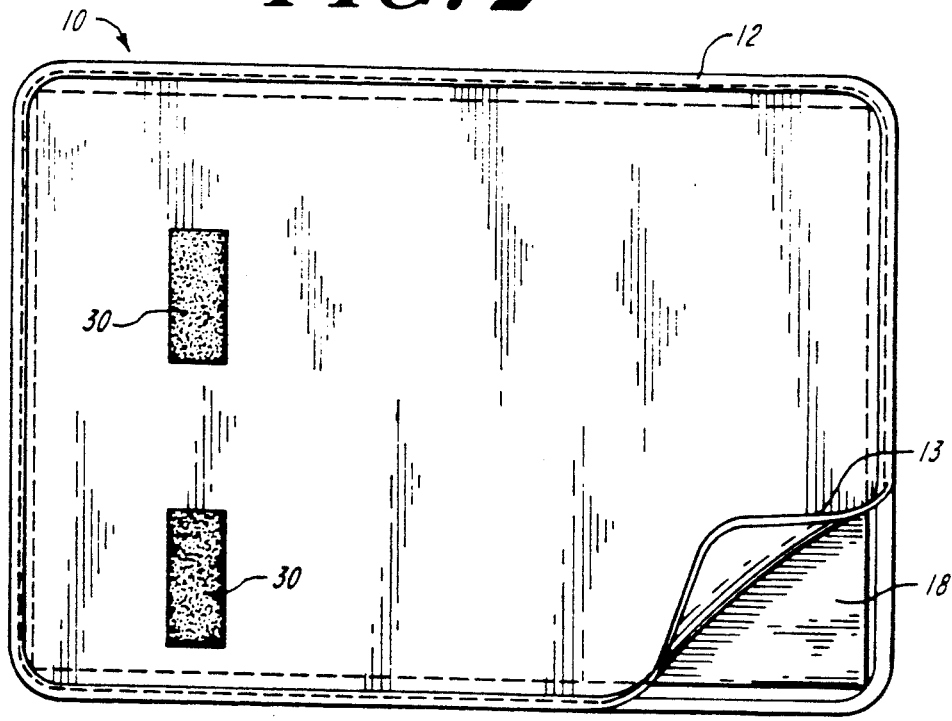
FIG. 3 is a rear elevational view showing the storage and travel case of FIG. 1.

FIG. 2 shows the front flap 14, having a generally rectangular shape, attached on three sides to the back flap 12 by a structure such as edging 11, to form a protective lining pocket 21. A protective lining 18 is removably positioned within the lining pocket 21 and secured therein by a lift-up flap 20 attached by edging 11 to the back flap 12. More specifically, as shown in FIG. 4, when the protective lining 18 is installed in the lining pocket 21, the lift-up flap 20 is folded down over the lining 18 and inserted into the lining pocket 21 to secure the lining 18 therein. FIG. 3 shows a portion of the back flap 12 removed to demonstrate the positioning of the lining 18.

When airport security personnel or other investigators desire to search the contents of the case 10, the protective lining 18 can be removed from the case 10 by opening front flap 14; such searching does not permanently damage the case 10. After inspection, the lining 18 can be repositioned in the lining pocket 21.

The case may be folded in any of a variety of configurations to provide added protection to the computer discs. For example, the front and back flaps 12 and 14 may include a first section 22, a middle section 24, and a second section 26, so that the second section 26 is folded along fold-line 25 and positioned on the middle section 24. The first section 22 is then folded along fold-section 27 so that the second section 22 is positioned on the second section 26.

Figure 5:
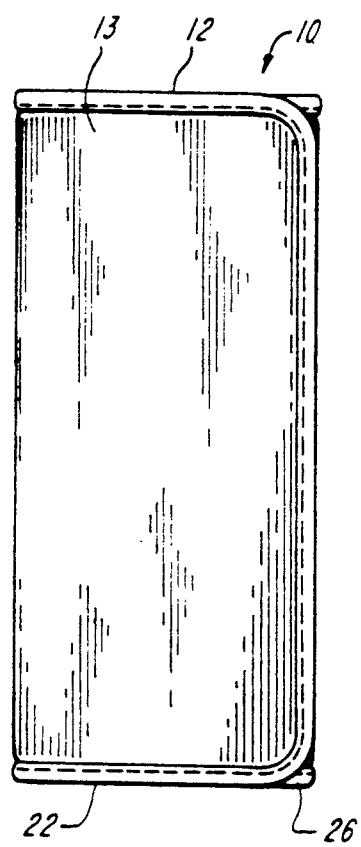
FIG. 5 is a front elevational view showing the storage and travel case of FIG. 1 in a folded configuration.

The case preferably further includes a fastener for removably securing the first section 22 to the second section 26, such as for example hook-and-wool patches 28 and 30, as shown in FIG. 3. FIG. 5 shows the case 10 folded and secured in the described configuration.

The case 10 may alternatively be folded and secured so that a portion of the front flap 14 is secured to another portion of the front flap 14, and/or a portion of the back flap 12 is secured to another portion of the back flap 12, so that the case 10 is folded in book or accordion fashion. Alternatively, one disc pocket 16 may be folded and secured to another disc pocket 16.

The back and front flaps 12 and 14, and the disc flaps 17 and 19 may be made of any flexible material, preferably a wear- and water-resistant material such as nylon fabric. Preferably all edges of the flaps 12, 14, 17 and 19 include edging 11. The protective lining 18 may suitably be a flexible lead lining of 1/32 inch thickness, such as, for example, a 0.1 millimeter lead equivalent lead vinyl available from Burlington Medical Supplies located in Haverhill, Mass. Other shielding compositions can be used, and a lead composition of greater or lesser thickness can alternatively be used, so long as the shielding composition provides the desired protection from X-ray or magnetic radiation damage.

We claim:

1. A computer disc storage and travel case comprising
   a back flap having outside and inside surfaces,
   a front flap having outside and inside surfaces,
   the front and back flaps being attached with each of said inside surfaces facing the other, forming a protective lining pocket between said inside surfaces,
   a disc flap affixed to one of said outside surfaces, forming a disc pocket between said disc flap and said outside surface, and
   a protective lining removably positionable within the lining pocket.

2. The computer disc storage and travel case of claim 1 further including a fastener for removably securing the outside side surface of the front flap to the outside surface of the back flap.

3. The computer disc storage and travel case of claim 1 further including at least one hook-and-wool patch for removably securing the outside surface of the front flap to the outside surface of the back flap.

4. The computer disc storage and travel case of claim 1 further including a fastener for removably securing one portion of the outside surface of the front flap to another portion of the outside surface of the front flap.

5. The computer disc storage and travel case of claim 1 further including at least one hook-and-wool patch for removably securing a portion of the outside surface of the front flap to another portion of the outside surface of the front flap.

6. The computer disc storage and travel case of claim 1 further including a fastener for removably securing a portion of the outside surface of the back flap to another portion of the outside surface of the back flap.

7. The computer disc storage and travel case of claim 1 further including at least one hook-and-wool patch for removably securing a portion of the outside surface of the back flap to another portion of the outside surface of the back flap.

8. The computer disc storage and travel case of claim 1 further including a fastener for removably securing one disc pocket to another disc pocket.

9. The computer disc storage and travel case of claim 1 further including at least one hook-and-wool patch for removably securing one disc pocket to another disc pocket.

10. The computer disc storage and travel case of claim 1 further including a fastener for removably securing the disc pocket to the outside surface of the back flap.

11. The computer disc storage and travel case of claim 1 further including at least one hook-and-wool patch for removably securing the disc pocket to the outside surface of the back flap.

12. The computer disc storage and travel case of claim 1 wherein
the back flap includes a lift-up flap for securing the protective lining within the lining pocket when the lift-up flap is folded down over the protective lining and inserted into the lining pocket.

13. The computer disc storage and travel case of claim 1 wherein
said protective lining includes a lead lining.

14. The computer disc storage and travel case of claim 13 wherein
said protective lining includes a lead polymer composition.

15. The computer disc storage and travel case of claim 1 wherein
said protective lining is flexible.

16. The computer disc storage and travel case of claim 1 wherein
the front and back flaps include
a first section,
a middle section, and
a second section,
said storage and travel case further including
a fastener for securing the outside surface of the front flap to the outside surface of the back flap when the second section is folded and positioned on the middle section and the first section is folded and positioned on the second section so that the second section is disposed between the middle and first sections.

* * * * *